(12) United States Patent
Suciu et al.

(10) Patent No.: US 9,435,259 B2
(45) Date of Patent: Sep. 6, 2016

(54) GAS TURBINE ENGINE COOLING SYSTEM

(75) Inventors: Gabriel L. Suciu, Glastonbury, CT (US); Ioannis Alvanos, West Springfield, MA (US)

(73) Assignee: United Technologies Corporation, Farmington, CT (US)

( * ) Notice: Subject to any disclaimer, the term of this patent is extended or adjusted under 35 U.S.C. 154(b) by 970 days.

(21) Appl. No.: 13/405,527

(22) Filed: Feb. 27, 2012

(65) Prior Publication Data

US 2013/0219920 A1  Aug. 29, 2013

(51) Int. Cl.
*F02C 6/08* (2006.01)
*F01D 5/08* (2006.01)
*F02C 7/08* (2006.01)

(52) U.S. Cl.
CPC . *F02C 6/08* (2013.01); *F01D 5/08* (2013.01); *F02C 7/08* (2013.01)

(58) Field of Classification Search
CPC .............. F02C 6/08; F02C 6/06; F02C 7/08; F01D 5/08; F01D 25/14; F01D 25/26; F01D 25/08; F02K 3/04
USPC .......................... 60/782, 785, 795, 806, 751
See application file for complete search history.

(56) References Cited

U.S. PATENT DOCUMENTS

| | | | |
|---|---|---|---|
| 4,561,246 A | 12/1985 | Hovan | |
| 4,574,584 A | 3/1986 | Hovan | |
| 4,709,545 A | 12/1987 | Stevens et al. | |
| 4,822,244 A | 4/1989 | Maier et al. | |
| 5,178,202 A | 1/1993 | Dannoura et al. | |
| 5,392,614 A | 2/1995 | Coffinberry | |
| 5,402,636 A | 4/1995 | Mize et al. | |
| 5,581,996 A * | 12/1996 | Koch et al. | 60/782 |
| 5,611,197 A | 3/1997 | Bunker | |
| 5,645,397 A | 7/1997 | Soechting et al. | |
| 5,782,076 A | 7/1998 | Huber et al. | |
| 5,918,458 A | 7/1999 | Coffinberry et al. | |
| 6,050,079 A * | 4/2000 | Durgin et al. | 60/782 |
| 6,098,395 A | 8/2000 | North | |
| 6,124,646 A | 9/2000 | Artinian et al. | |

(Continued)

FOREIGN PATENT DOCUMENTS

| | | |
|---|---|---|
| EP | 0570217 B1 | 10/1997 |
| EP | 0608142 B1 | 10/1999 |

(Continued)

OTHER PUBLICATIONS

International Search Report and Written Opinion of the International Search Authority for International application No. PCT/US2013/025507 dated Jun. 2, 2013.

(Continued)

*Primary Examiner* — Phutthiwat Wongwian
*Assistant Examiner* — Stefan Ibroni
(74) *Attorney, Agent, or Firm* — Carlson, Gaskey & Olds

(57) ABSTRACT

A gas turbine engine includes a heat exchanger, a diffuser case, a passageway and a nozzle assembly. The heat exchanger exchanges heat with a bleed airflow to provide a conditioned airflow. The diffuser case includes a plenum that receives the conditioned airflow. The passageway is fluidly connected between the heat exchanger and the diffuser case, and the conditioned airflow is communicated through the passageway and into the plenum. The nozzle assembly is in fluid communication with the plenum of the diffuser case to receive the conditioned airflow from the plenum.

19 Claims, 3 Drawing Sheets

(56) References Cited

U.S. PATENT DOCUMENTS

| | | |
|---|---|---|
| 6,183,193 B1 | 2/2001 | Glasspoole et al. |
| 6,250,061 B1 | 6/2001 | Orlando |
| 6,267,553 B1 | 7/2001 | Burge |
| 6,468,032 B2 | 10/2002 | Patel |
| 7,000,404 B2 | 2/2006 | Palmisano et al. |
| 7,114,339 B2 | 10/2006 | Alvanos et al. |
| 7,562,519 B1 | 7/2009 | Harris et al. |
| 7,823,389 B2 | 11/2010 | Seitzer et al. |
| 8,056,345 B2 | 11/2011 | Norris et al. |
| 8,061,969 B2 | 11/2011 | Durocher et al. |
| 8,459,040 B2 | 6/2013 | Glahn et al. |
| 8,683,811 B2 | 4/2014 | Clemen et al. |
| 2002/0076318 A1 | 6/2002 | Patel |
| 2002/0148213 A1 | 10/2002 | Yu |
| 2005/0111964 A1 | 5/2005 | Krammer et al. |
| 2006/0285968 A1 | 12/2006 | Riahi et al. |
| 2008/0041064 A1 | 2/2008 | Moore et al. |
| 2008/0112795 A1 | 5/2008 | Lee et al. |
| 2008/0112798 A1 | 5/2008 | Seitzer et al. |
| 2008/0141678 A1* | 6/2008 | Brunet et al. ............... 60/806 |
| 2008/0310955 A1 | 12/2008 | Norris et al. |
| 2009/0010751 A1 | 1/2009 | McCaffrey et al. |
| 2009/0019858 A1 | 1/2009 | Roberge |
| 2009/0044543 A1 | 2/2009 | Clemen et al. |
| 2010/0132370 A1 | 6/2010 | Durocher et al. |
| 2010/0275612 A1 | 11/2010 | Smoke et al. |
| 2011/0030386 A1 | 2/2011 | Kumar et al. |
| 2011/0072832 A1* | 3/2011 | Blanchard et al. ............ 60/806 |
| 2011/0079019 A1 | 4/2011 | Durocher et al. |
| 2011/0088405 A1 | 4/2011 | Turco |
| 2011/0126543 A1 | 6/2011 | Kirsopp et al. |
| 2011/0247344 A1 | 10/2011 | Glahn et al. |
| 2011/0271689 A1 | 11/2011 | Lacy et al. |

FOREIGN PATENT DOCUMENTS

| | | |
|---|---|---|
| EP | 1503061 A1 | 2/2005 |
| EP | 2374995 A2 | 10/2011 |

OTHER PUBLICATIONS

International Search Report and Written Opinion of the International Search Authority for International application No. PCT/US2013/025506 dated May 24, 2013.
International Search Report and Written Opinion of the International Search Authority for International application No. PCT/US2013/026766 dated May 29, 2013.
International Search Report and Written Opinion of the International Search Authority for International application No. PCT/US2013/026767 dated Jun. 4, 2013.
International Preliminary Report on Patentability for International application No. PCT/US2013/026766 dated Sep. 12, 2014.
International Preliminary Report on Patentability for International application No. PCT/US2013/025507 dated Sep. 12, 2014.
International Preliminary Report on Patentability for International application No. PCT/US2013/025506 dated Sep. 12, 2014.
International Preliminary Report on Patentability for International application No. PCT/US2013/026767 dated Sep. 12, 2014.
Intellectual Property Office of Singapore Written Opinion for Singapore Application No. 11201404760Y, dated Jan. 14, 2015.
Intellectual Property Office of Singapore, Search Report and Written Opinion for Singapore Patent Application No. 1120140270R dated Jul. 9, 2015.
Search Report and Written Opinion issued by the Intellectual Property Office of Singapore for Application No. SG 11201404271U dated Nov. 25, 2015.
Supplementary European Search Report for Application No. EP 13 75 4366 dated Dec. 1, 2015.
European Search Report for Application No. 13754271.8 dated Oct. 15, 2015.

* cited by examiner

GAS TURBINE ENGINE COOLING SYSTEM

BACKGROUND

This disclosure relates to a gas turbine engine, and more particularly to a cooled cooling air system for conditioning portions of a gas turbine engine.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine loads.

Gas turbine engines channel airflow through the core engine components along a primary gas path. The airflow communicated along the primary gas path is typically of a relatively high operating temperature. The material properties of gas turbine engine hardware can limit the ability to operate the gas turbine engine utilizing cycles which require higher temperatures.

SUMMARY

A gas turbine engine includes a heat exchanger, a diffuser case, a passageway and a nozzle assembly. The heat exchanger exchanges heat with a bleed airflow to provide a conditioned airflow. The diffuser case includes a plenum that receives the conditioned airflow. The passageway is fluidly connected between the heat exchanger and the diffuser case, and the conditioned airflow is communicated through the passageway and into the plenum. The nozzle assembly is in fluid communication with the plenum of the diffuser case to receive the conditioned airflow from the plenum.

In a further embodiment of the foregoing gas turbine engine embodiment, the nozzle assembly can include a tangential onboard injection (TOBI) nozzle.

In a further embodiment of either of the foregoing gas turbine engine embodiments, a rotor assembly is conditioned by the conditioned airflow from the nozzle assembly.

In a further embodiment of any of the foregoing gas turbine engine embodiments, the rotor assembly can be a component of a turbine section of the gas turbine engine.

In a further embodiment of any of the foregoing gas turbine engine embodiments, the passageway can include tubing.

In a further embodiment of any of the foregoing gas turbine engine embodiments, the bleed airflow can be communicated from a compressor section of the gas turbine engine.

In a further embodiment of any of the foregoing gas turbine engine embodiments, the heat exchanger can exchange heat between a bleed airflow and a fan airflow to render the conditioned airflow.

In a further embodiment of any of the foregoing gas turbine engine embodiments, the diffuser case can include an outer wall and an inner wall and the plenum extends between the outer wall and the inner wall.

In a further embodiment of any of the foregoing gas turbine engine embodiments, the plenum can includes a plurality of castellations that are circumferentially disposed about the plenum.

In a further embodiment of any of the foregoing gas turbine engine embodiments, the plurality of castellations can divide the plenum into a plurality of passages.

In a further embodiment of any of the foregoing gas turbine engine embodiments, the diffuser case can extend radially inwardly from a combustor of the gas turbine engine and divide an interior of a portion of the gas turbine engine into an outer cavity and an inner cavity.

In a further embodiment of any of the foregoing gas turbine engine embodiments, the gas turbine engine can exclude a bearing compartment at a radially inward position from the combustor.

In another exemplary embodiment, a method of conditioning a portion of a gas turbine engine includes removing heat from a bleed airflow to render a conditioned airflow, communicating the conditioned airflow through a plenum of a diffuser case, and feeding the conditioned airflow through a nozzle assembly to a downstream location of the gas turbine engine.

In a further embodiment of the foregoing method, the method can include the step of cooling a rotor assembly of the gas turbine engine with the conditioned airflow.

In a further embodiment of either of the foregoing method embodiments, the step of communicating the conditioned airflow can include communicating the conditioned airflow along a formed plenum path that extends from a heat exchanger, through a passageway, then through the plenum, and then through the nozzle assembly.

In yet another exemplary embodiment, a gas turbine engine includes a compressor section, a turbine section downstream from the compressor section, and a combustor section positioned between the compressor section and the turbine section. A cooled cooling air system includes a heat exchanger, a diffuser case having a plenum that axially extends radially inwardly from the combustor section, and a nozzle assembly. The cooled cooling air system establishes a formed plenum path that extends from the heat exchanger, through the plenum and then through the nozzle assembly to condition hardware of the turbine section.

The various features and advantages of this disclosure will become apparent to those skilled in the art from the following detailed description. The drawings that accompany the detailed description can be briefly described as follows.

DETAILED DESCRIPTION

Figure 1:
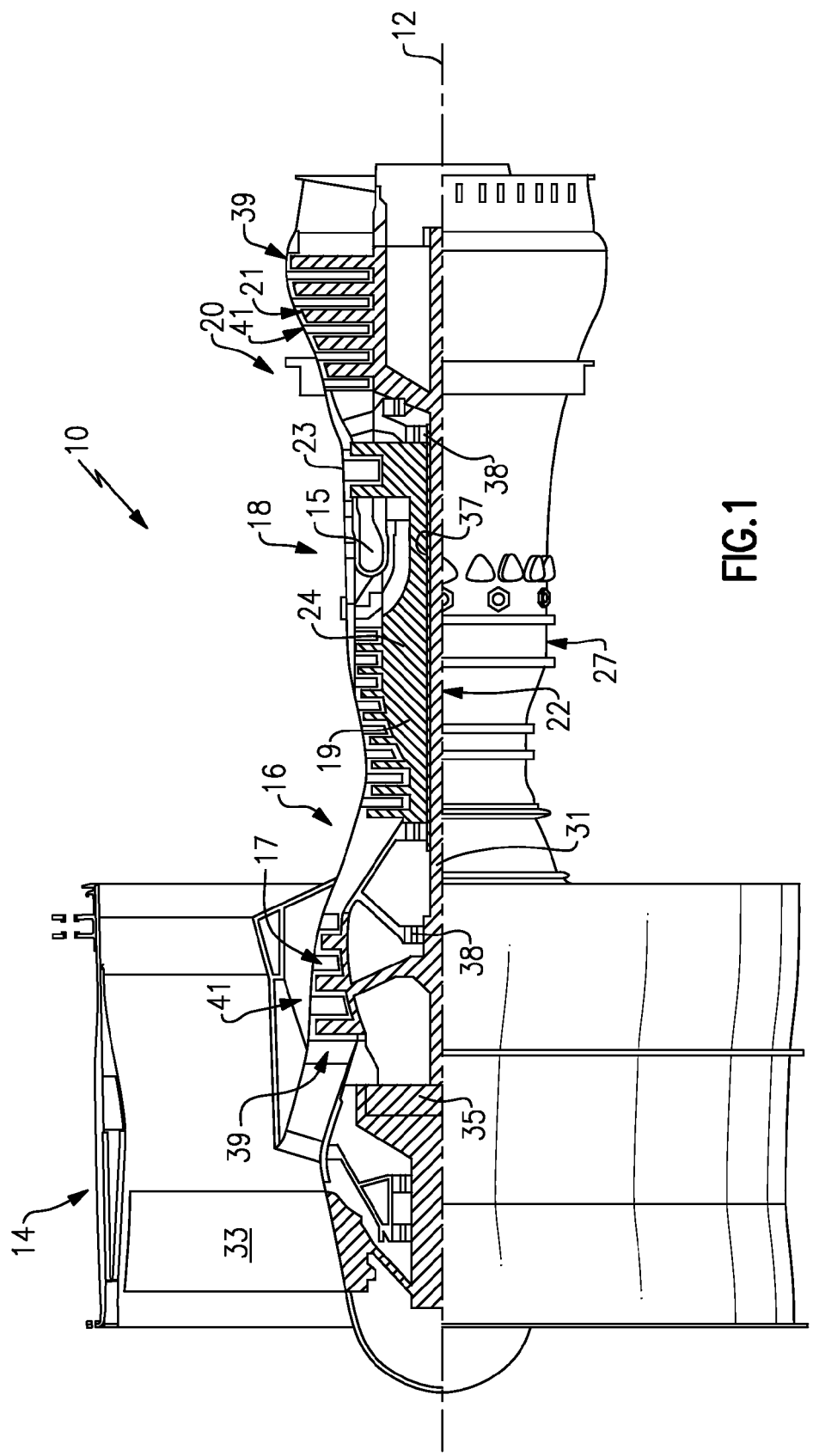
FIG. 1 schematically illustrates a cross-sectional view of a gas turbine engine.

FIG. 1 schematically illustrates a gas turbine engine 10. The example gas turbine engine 10 is a two spool turbofan engine that generally incorporates a fan section 14, a compressor section 16, a combustor section 18 and a turbine section 20. Alternative engines could include fewer or additional sections such as an augmenter section (not shown), among other systems or features. Generally, the fan section 14 drives air along a bypass flow path, while the compressor section 16 drives air along a core flow path for compression and communication into the combustor section 18. The hot combustion gases generated in the combustor section 18 are expanded through the turbine section 20. This view is highly schematic and is included to provide a basic understanding of the gas turbine engine 10 and not to limit the disclosure. This disclosure extends to all types of gas turbine engines and to all types of applications, including but not limited to, three spool turbofan configurations.

The exemplary gas turbine engine 10 of FIG. 1 generally includes at least a low speed spool 22 and a high speed spool 24 mounted for rotation about an engine centerline axis 12 relative to an engine static structure 27 via several bearing systems 38. The low speed spool 22 generally includes an inner shaft 31 that interconnects a fan 33, a low pressure compressor 17, and a low pressure turbine 21. The inner shaft 31 can connect to the fan 33 through a geared architecture 35 to drive the fan 33 at a lower speed than the low speed spool 22. Although the geared architecture 35 is schematically depicted between the fan 33 and the low pressure compressor 17, it should be understood that the geared architecture 35 could be disposed at other locations of the gas turbine engine. The high speed spool 24 includes an outer shaft 37 that interconnects a high pressure compressor 19 and a high pressure turbine 23.

A combustor 15 is arranged between the high pressure compressor 19 and the high pressure turbine 23. The inner shaft 31 and the outer shaft 37 are concentric and rotate about the engine centerline axis 12. A core airflow is compressed by the low pressure compressor 17 and the high pressure compressor 19, is mixed with fuel and burned within the combustor 15, and is then expanded over the high pressure turbine 23 and the low pressure turbine 21. The turbines 21, 23 rotationally drive the low speed spool 22 and the high speed spool 24 in response to the expansion.

The compressor section 16 and the turbine section 20 can each include alternating rows of rotor assemblies 39 and vane assemblies 41. The rotor assemblies 39 carry a plurality of rotating blades, while each vane assembly 41 includes a plurality of vanes. The blades of the rotor assemblies 39 create or extract energy (in the form of pressure) from the airflow that is communicated through the gas turbine engine 10. The vanes of the vane assemblies 41 direct airflow to the blades of the rotor assemblies 39 to either add or extract energy.

It should be understood that the various bearing systems 38 could be positioned at alternative or additional locations of the gas turbine engine 10. The bearing systems 38, along with other gas turbine engine structures and systems, define internal compartments of the gas turbine engine 10.

Figure 2:
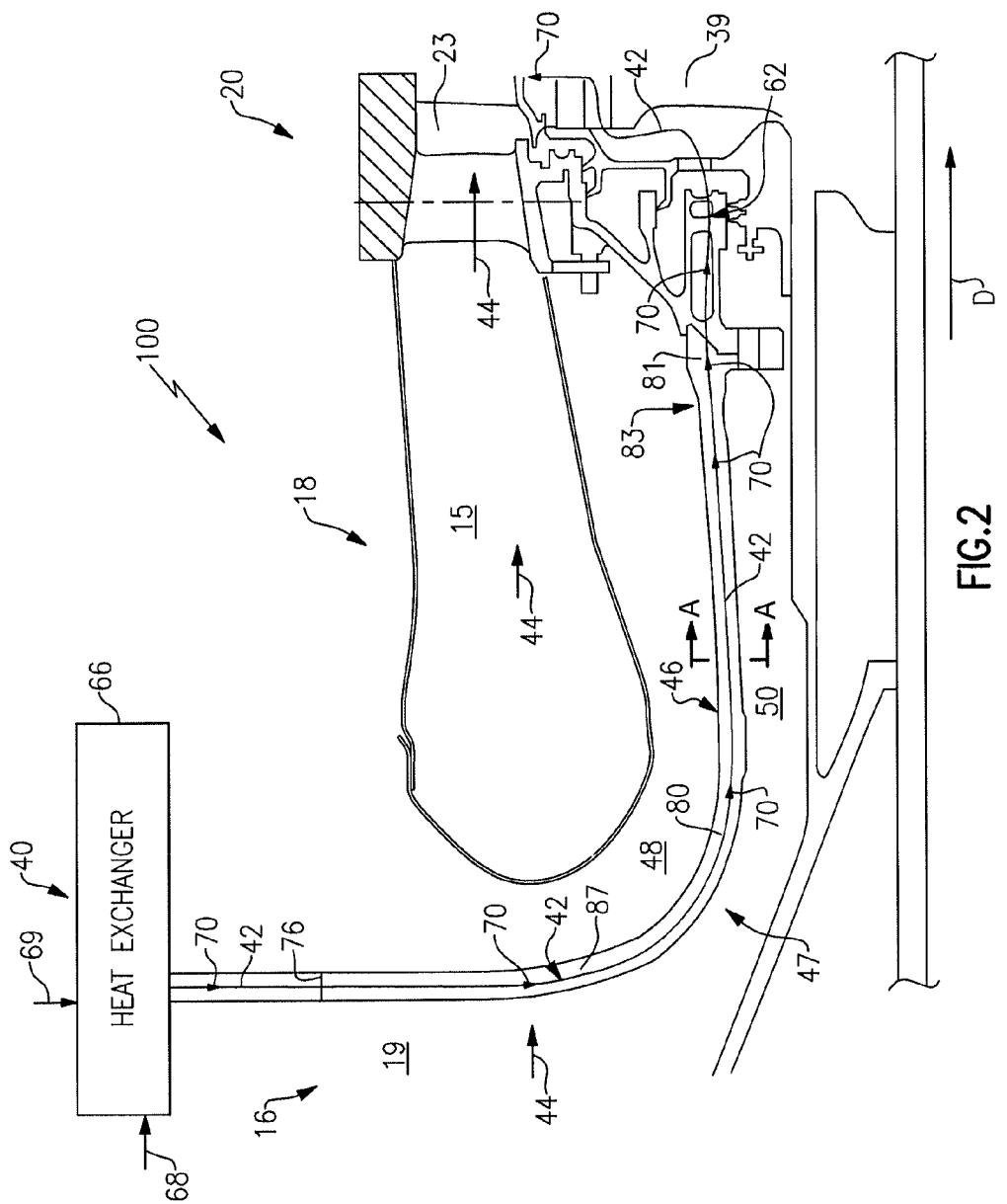
FIG. 2 illustrates a cooled cooling air system that can be incorporated into a gas turbine engine.

FIG. 2 illustrates a portion 100 of a gas turbine engine, such as the gas turbine engine 10. In this example, the portion 100 encompasses parts of the compressor section 16, the combustor section 18 and the turbine section 20 of the gas turbine engine 10. However, it should be understood that this disclosure could extend to other parts of these sections beyond what is shown by FIG. 2.

In this example, the gas turbine engine 10 excludes any bearing system at a radial inward position from the combustor 15. However, as noted above and as depicted in FIG. 1, the gas turbine engine 10 could include bearing systems 38 positioned at various other locations of the gas turbine engine 10.

The gas turbine engine 10 includes a cooled cooling air system 40 which utilizes a formed plenum path 42 for the communication of a conditioned airflow 70 to condition certain hardware of the gas turbine engine 10. In this disclosure, the term "conditioned airflow" includes both cooled and heated airflows. The cooled cooling air system 40 includes a heat exchanger 66, a diffuser case 46, and a nozzle assembly 62 that is fed with the conditioned airflow 70 that is communicated through and received from the diffuser case 46 with the formed plenum path 42.

In the illustrated example, the diffuser case 46 extends radially inwardly from the combustor 15 and divides an interior 47 of the portion 100 into an outer cavity 48 and an inner cavity 50. The primary gas path 44 (for the communication of core airflow) can be communicated through the outer cavity 48, while the formed plenum path 42 extends at least partially through a plenum 80 (i.e., a passage that extends through the diffuser case 46 along at least a portion of the axial length of the diffuser case 46). The formed plenum path 42 is separate from the primary gas path 44 that communicates the core airflow. In this example, the primary gas path 44 extends through the high pressure compressor 19, the combustor 15 and then axially through the high pressure turbine 23, and the formed plenum path 42 is generally radially inward from the primary gas path 44.

Figure 3:
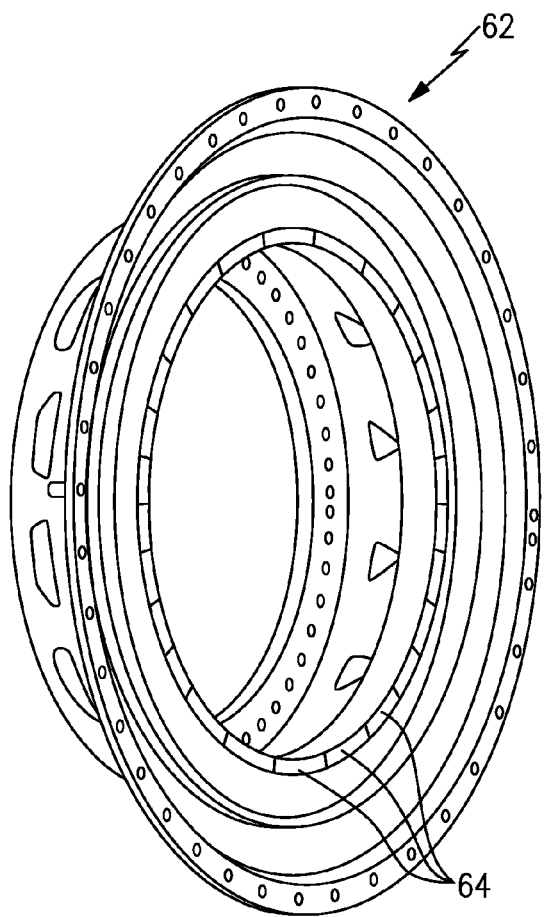
FIG. 3 illustrates an example nozzle assembly of the cooled cooling air system of FIG. 2.

The nozzle assembly 62 communicates the conditioned airflow 70 of the formed plenum path 42 in a downstream direction D toward the high pressure turbine 23 and its associated hardware. The nozzle assembly 62 can include a tangential onboard injection (TOBI) nozzle or other suitable nozzle that is capable of receiving and communicating the conditioned airflow 70. The TOBI nozzle imparts a swirling movement and directs the airflow tangentially to downstream hardware, such as to a rotor assembly 39 of the high pressure turbine 23. An example nozzle assembly 62 is illustrated in FIG. 3. The nozzle assembly 62 can include a plurality of openings 64 for communicating the conditioned airflow 70 of the formed plenum path 42. Other nozzle assembly configurations beyond what is illustrated by FIG. 3 are also contemplated.

The heat exchanger 66 producing the cooled cooling air 40 can be mounted at any location of the gas turbine engine 10. One example non-limiting mounting location is at the outer engine casing. The heat exchanger receives a bleed airflow 68, such as from the compressor section 16 or some other upstream location of the gas turbine engine 10, and exchanges heat between the bleed airflow 68 and another fluid medium 69 to render the conditioned airflow 70. One example fluid medium 69 includes airflow from the fan section 14. However, the heat exchanger 66 could be any type of heat exchanger including an air/air heat exchanger, a fuel/air heat exchanger or any other heat exchanger.

The conditioned airflow 70 is communicated along the formed plenum path 42. The formed plenum path 42 extends from the heat exchanger 66, through the plenum 80 of the diffuser case 46, and then through the nozzle assembly 62 to a location that is onboard of hardware, including but not limited to one or more rotor assemblies 39 of the high pressure turbine 23. Other hardware of the gas turbine engine 10 can additionally or alternatively be conditioned by the cooled cooling air system 40. The conditioned airflow 70 communicated along the formed plenum path 42 can be used to condition the disk, rim, web and blade of the rotor assemblies 39, as well as other downstream stages, parts and components in order to reduce the relatively high temperature impact experienced by such hardware during engine operation.

The formed plenum path 42 extends through a passageway 76 that is positioned between the heat exchanger 66 and the diffuser case 46. In this example, the passageway 76 radially extends between the heat exchanger 66 and an inlet 87 of the plenum 80. The conditioned airflow 70 is communicated through the passageway 76 and then into the plenum 80 of the diffuser case 46. In this example, the plenum 80 extends across an entire axial length of the diffuser case 46. The passageway 76 can include tubing, ducting or other conduits that are capable of communicating the conditioned airflow 70 through the gas turbine engine 10. It should be understood that the passageway 76 is not necessarily shown to the scale it would be in practice. Rather, in the illustrated embodiment, the passageway 76 is shown enlarged to better illustrate its features. The passageway 76 could be positioned at other locales of the portion 100 besides those depicted in FIG. 2.

The plenum 80 opens into a cavity 81 near a downstream portion 83 of the diffuser case 46. The cavity 81 is disposed between the diffuser case 46 and the nozzle assembly 62. The cavity 81 feeds the conditioned airflow 70 to the nozzle assembly 62.

Figure 4:
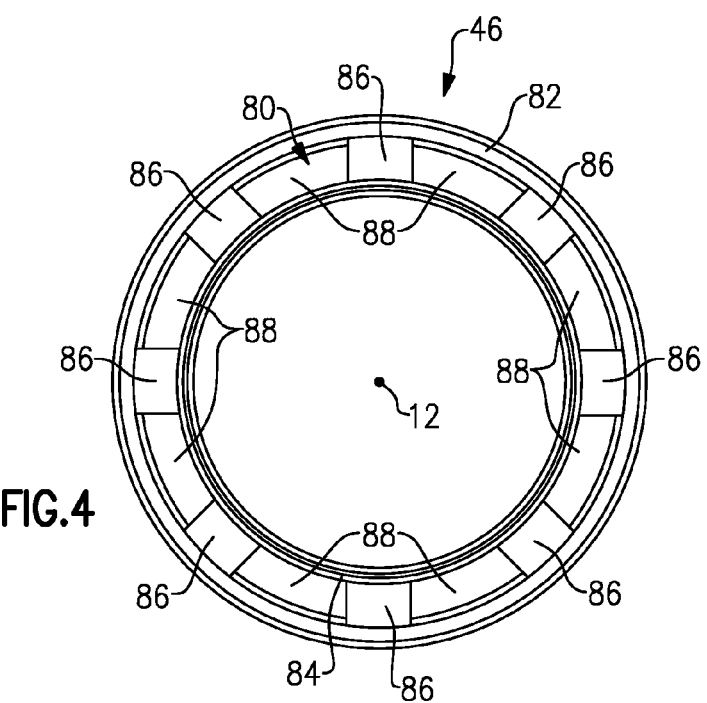
FIG. 4 illustrates a sectional view through Section A-A of FIG. 2.

Referring to FIG. 4, the diffuser case 46 can include an outer wall 82 and an inner wall 84 that are circumferentially disposed about the engine centerline axis 12. The plenum 80 extends between the outer wall 82 and the inner wall 84. A plurality of castellations 86 can radially extend between the outer wall 82 and the inner wall 84 to divide the plenum 80 into multiple passages 88. The conditioned airflow 70 is communicated through the passages 88.

The castellations 86 are circumferentially disposed about portion of (or an entirety of) the circumference of the plenum 80 of the diffuser case 46 and can be positioned at multiple axial locations of the plenum 80. The castellations 86 are positioned within the plenum 80 to avoid starving the downstream hardware of the gas turbine engine 10 of the conditioned airflow 70 due to any thermal growth, maneuvers, pressure differentials, etc. of the diffuser case 46 hardware assembly during engine operation.

Although the different examples have a specific component shown in the illustrations, embodiments of this disclosure are not limited to those particular combinations. It is possible to use some of the components or features from one of the examples in combination with features or components from another one of the examples.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
a heat exchanger that exchanges heat with a bleed airflow to provide a conditioned airflow;
a diffuser case having a plenum disposed inside said diffuser case that receives said conditioned airflow, said diffuser case including an outer circumferential wall and an inner circumferential wall that is circumscribed by said outer circumferential wall, said plenum extends radially from said outer circumferential wall to said inner circumferential wall, and said plenum extends along an entire axial length of said diffuser case;
a passageway fluidly connected between said heat exchanger and said diffuser case, wherein said conditioned airflow is communicated through said passageway and into said plenum; and
a nozzle assembly in fluid communication with said plenum of said diffuser case to receive said conditioned airflow from said plenum.

2. The gas turbine engine as recited in claim 1, wherein said nozzle assembly is a tangential onboard injection (TOBI) nozzle.

3. The gas turbine engine as recited in claim 1, comprising a rotor assembly downstream from said nozzle assembly, wherein said rotor assembly is conditioned by said conditioned airflow from said nozzle assembly.

4. The gas turbine engine as recited in claim 3, wherein said rotor assembly is a component of a turbine section of the gas turbine engine.

5. The gas turbine engine as recited in claim 1, wherein said passageway includes tubing.

6. The gas turbine engine as recited in claim 1, wherein said bleed airflow is communicated from a compressor section of the gas turbine engine.

7. The gas turbine engine as recited in claim 1, wherein said heat exchanger exchanges heat between said bleed airflow and a fan airflow to render said conditioned airflow.

8. The gas turbine engine as recited in claim 1, wherein said plenum includes a plurality of castellations circumferentially disposed about said plenum.

9. The gas turbine engine as recited in claim 8, wherein said plurality of castellations divide said plenum into a plurality of passages.

10. The gas turbine engine as recited in claim 1, wherein said diffuser case extends radially inwardly from a combustor of the gas turbine engine and divides an interior of a portion of the gas turbine engine into an outer cavity and an inner cavity.

11. The gas turbine engine as recited in claim 10, wherein the gas turbine engine excludes a bearing compartment anywhere directly radially inward from said combustor.

12. The gas turbine engine as recited in claim 1, comprising a plurality of castellations radially extending between said outer circumferential wall and said inner circumferential wall to divide said plenum into a plurality of passages.

13. The gas turbine engine as recited in claim 1, wherein the gas turbine engine excludes any bearing compartments located in a space between a first radial plane that extends through a leading edge of a combustor and a second radial plane that extends through a trailing edge of said combustor.

14. The gas turbine engine as recited in claim 2, wherein said TOBI nozzle includes a plurality of openings configured to tangentially direct said conditioned airflow to downstream hardware.

15. A method of conditioning a portion of a gas turbine engine, comprising:
removing heat from a bleed airflow to render a conditioned airflow;
communicating the conditioned airflow through a plenum disposed inside a diffuser case, the diffuser case including an outer circumferential wall and an inner circumferential wall that is circumscribed by the outer circumferential wall, the plenum extends radially from the outer circumferential wall to the inner circumferential wall, and said plenum extends along an entire axial length of said diffuser case; and
feeding the conditioned airflow through a nozzle assembly to a downstream location of the gas turbine engine.

16. The method as recited in claim 15, comprising the step of cooling a rotor assembly of the gas turbine engine with the conditioned airflow.

17. The method as recited in claim 15, wherein the step of communicating the conditioned airflow includes:
communicating the conditioned airflow along a formed plenum path that extends from a heat exchanger, through a passageway, then through the plenum, and then through the nozzle assembly.

18. A gas turbine engine, comprising:
a compressor section;
a turbine section downstream from said compressor section;
a combustor section positioned between said compressor section and said turbine section;
and a cooled cooling air system that includes a heat exchanger, a diffuser case and a nozzle assembly, said diffuser case including an outer circumferential wall and an inner circumferential wall that is circumscribed by said outer circumferential wall, and a plenum is disposed inside said diffuser case and extends radially from said outer circumferential wall to said inner circumferential wall, wherein said plenum extends along an entire axial length of said diffuser case, and wherein said cooled cooling air system establishes a formed plenum path that extends from said heat exchanger, through an inside of said plenum and then through said nozzle assembly to condition hardware of said turbine section.

19. The gas turbine engine as recited in claim 18, wherein the gas turbine engine excludes a bearing compartment located at any location that is directly radially inward from said combustor.

* * * * *